Dec. 17, 1957  C. A. FRANK ET AL  2,816,453
ROLLER CHAIN
Filed Nov. 2, 1955
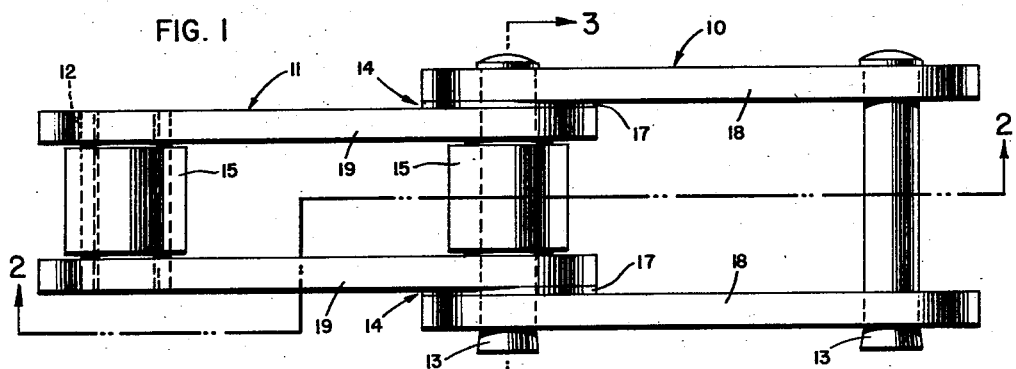
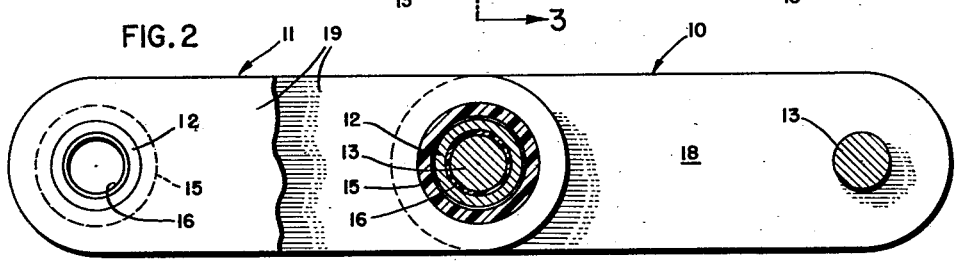
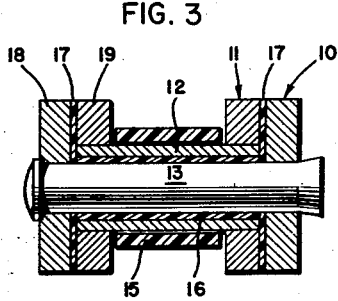
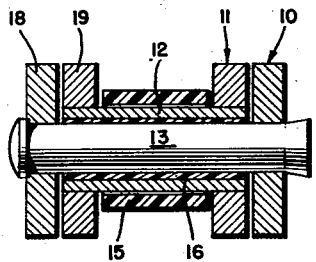
INVENTORS
Carl A. Frank
John S. Bartlo
BY
ATTORNEY

United States Patent Office 2,816,453
Patented Dec. 17, 1957

2,816,453

ROLLER CHAIN

Carl A. Frank, Hillsdale, and John S. Bartlo, Wallington, N. J., assignors, by direct and mesne assignments, to Lynch Corporation, a corporation of Indiana Application November 2, 1955, Serial No. 544,530

4 Claims. (Cl. 74—251)

This invention relates to metallic transmission chains and particularly to such chains of the roller link type. Such chains are generally well known and the present invention is concerned with specific modifications of such chain for special purposes. It is well known that in use such chain on machines requires lubrication to reduce wear and to insure efficient operation with a minimum of breakdowns such as periodically occur, requiring replacement of a link, pin or roller, or a combination of them. It is well known, also, that the use of lubricants on chain results in the accumulation of dirt and grit which attaches itself to the lubricant as well as the chain and works its way into the machine with consequent injurious effect. This also affects the appearance of the machine as well as that of the operators and attendants thereof, causing a generally unsightly appearance about the machine. Considerable use of such chain has been made in the art of conveyors and the principal object of this invention is to improve roller chain for such use to avoid the disadvantages discussed above.

In the conveyor handling of certain products such as foods and medicines, including cereals, flour, confections, pills, capsules, etc., the utmost of sanitary conditions are required and rigid State and Federal sanitary regulations must be complied with under inspection systems which cause the processor of such products to be continually on the alert to guard against unsanitary conditions. Lubricated, moving mechanisms are great offenders in this respect, and therefore it is a principal object of this invention to eliminate much of the disadvantages discussed above by providing a metallic roller chain which requires no lubrication, without substantially affecting its physical properties in any essential respect, or interfering with its efficient operation, yet at the same time reducing the noise inherent in its use. This is accomplished by eliminating the metal to metal contact of the movable parts of the chain. While reference has here been made to the application of the chain to conveyors, this is merely by way of example, and is not intended to limit the scope of the invention as the chain may be equally useful in other applications.

For a more complete understanding of the invention, reference is made to the accompanying drawings and specification delineating and describing the invention.

In the drawings,

Figure 1 is a plan view of a roller chain section embodying the invention.

Figure 2 is a vertical, sectional view thereof along the line 2—2 of Figure 1.

Figure 3 is a vertical sectional view of Figure 1, taken along the line 3—3 thereof.

Figure 4 is a view similar to Figure 3, but with the intermediate washers between the sides of the links omitted.

Referring to the drawings, the chain comprises the usual interlocking metallic pin links 10 and bushing links 11, with the pin bushings 12 fitted over the pins 13. In the usual and known constructions, it has been necessary to provide lubrication for the chain at such points as 14, between the side plates of the links and between the pins 13 and the bushings 12, as well as between the bushings 12 and the roller sleeves 15 which are mounted thereon.

The present invention contemplates the use of an anti-friction, non-metallic, sound reducing material such as Nylon to be used as a liner or spacer at all points where friction normally occurs. It is known that Nylon, and like hard, thermoplastic, resinous materials, are characterized by a low coefficient of friction with metals. Such materials are suited for bearing surfaces associated with moving metal parts without any need for lubrication. Thus, a very thin walled Nylon liner 16 is provided between the pin 13 and the bushing 12, this liner being preferably split longitudinally to allow for thermal expansion under operating conditions and being fitted closely to the interior bore of the bushing 12. A Nylon roller sleeve 15 is fitted over the bushing 12, this sleeve being a loose fit on the bushing so that it may rotate freely thereon. Additionally, a very thin Nylon disc or washer 17 is provided between the side plates 18 and 19, to reduce friction between these parts without substantially increasing the overall width of the chain to a point where any appreciable alteration is made in standard chain specifications for most industrial applications.

The use of Nylon at the points mentioned provides a metallic chain without metal to metal contact where wear normally occurs and eliminates the need for lubrication at those points. Also, a feature of considerable significance, it substantially reduces the noise heretofore caused by such chain when in use, especially when it passes over a sprocket of metal. The lubrication of such chain is usually by wick or drip which inevitably collects dust and grit on the machine and floor around it. The elimination of the need for lubrication reduces this collection of dust and grit on the machine, greatly improving its appearance as well as that of its environs and the operators and attendants thereof, and makes it much easier for processors to comply with modern sanitation standards.

The greatest wear occurs between the pin 13 and the bushing 12, and between the bushing 12 and the outer roller sleeve 15. The interposition of Nylon liners at these points greatly reduces that wear, makes the chain last longer and run more quietly. Wear also occurs between the contacting faces of the side plates 18 and 19, but here the problem is not so great, so that the washers 17 may be omitted if desired.

Having thus described our invention, we claim:

1. In a roller chain for a sprocket drive, said chain being of the type including alternate pairs of metallic pin links and bushing links pivotally interconnected in adjoining and overlapping series by means of cross pins each carrying a sprocket-engaging roller sleeve, the improvements comprising in combination, lineor means disposed between said pin and said links, said roller sleeve and said liner means being formed from a hard, thermoplastic, resinous material, characterized by a low coefficient of friction with metal.

2. In a roller chain for a sprocket drive, said chain being of the type including alternate pairs of metallic pin links and bushing links pivotally interconnected in adjoining and overlapping series by means of cross pins each carrying a sprocket-engaging roller sleeve, the improvements comprising in combination, linear means disposed between said pin and said links, said roller sleeve and said liner means being formed from a Nylon.

3. In a roller chain for a sprocket drive, said chain being of the type including alternate pairs of metallic pin links and bushing links pivotally interconnected in adjoining and overlapping series by means of cross pins and surrounding sleeves, said bushing links carrying a sprocket-engaging roller bushing, the improvements comprising in combination, washer means disposed between the overlapping portions of said links, liner means substantially surrounding said pin, said roller sleeve, washer means and liner means being formed from a hard, thermoplastic, resinous material, characterized by a low coefficient of friction with metal.

4. In a roller chain for a sprocket drive, said chain being of the type including alternate pairs of metallic pin links and bushing links pivotally interconnected in adjoining and overlapping series by means of cross pins and surrounding sleeves, said bushing links loosely carrying a sprocket-engaging roller sleeve, the improvements comprising in combination, a pair of washers each disposed between corresponding overlapping portions of said links, a split sleeve substantially tightly fitting within said bushing links, and surrounding said pin, said roller sleeve, washers and split liner being formed from a hard, thermoplastic resinous material, characterized by a low coefficient of friction with metal.

References Cited in the file of this patent

UNITED STATES PATENTS

| | | |
|---|---|---|
| 336,921 | Jeffrey | Mar. 2, 1886 |
| 2,185,702 | Bremer | Jan. 2, 1940 |
| 2,557,963 | Hapman | June 26, 1951 |
| 2,622,949 | Cotchett | Dec. 23, 1952 |

OTHER REFERENCES

Product Engineering, July 1950, pages 102–107, "Nylon in Bearings and Gears."